(12) United States Patent
Chang et al.

(10) Patent No.: US 11,119,842 B2
(45) Date of Patent: Sep. 14, 2021

(54) INPUT DATA CORRECTION

(71) Applicant: INTERNATIONAL BUSINESS MACHINES CORPORATION, Armonk, NY (US)

(72) Inventors: Hung-Yang Chang, Scarsdale, NY (US); James V. Codella, Danbury, CT (US); Subhro Das, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 16/681,761

(22) Filed: Nov. 12, 2019

(65) Prior Publication Data

US 2020/0081759 A1    Mar. 12, 2020

Related U.S. Application Data

(63) Continuation of application No. 15/581,869, filed on Apr. 28, 2017, now Pat. No. 10,585,739.

(51) Int. Cl.
*G06F 11/00* (2006.01)
*G06F 11/07* (2006.01)
(Continued)

(52) U.S. Cl.
CPC .......... *G06F 11/079* (2013.01); *G05B 23/024* (2013.01); *G06F 11/0721* (2013.01);
(Continued)

(58) Field of Classification Search
CPC ..... G06N 20/00; G05B 23/024; G06F 11/079; G06F 11/0721; G06F 11/0742; G06F 11/3024; G06F 11/3452
See application file for complete search history.

(56) References Cited

U.S. PATENT DOCUMENTS 8,920,332 B2    12/2014  Hong et al.
8,935,119 B2    1/2015   Yuen
(Continued)

FOREIGN PATENT DOCUMENTS

WO       2016111696 A1    1/2016

OTHER PUBLICATIONS

Onyango, Improving Accuracy in Arrival Time Prediction Using Support Vector Regression, Jun. 2015, https://pdfs.semanticscholar.org, 103 pages (Year: 2015).
(Continued)

*Primary Examiner* — Katherine Lin
(74) *Attorney, Agent, or Firm* — Cantor Colburn LLP; Kristofer Haggerty

(57) ABSTRACT

Technical solutions are described that address correcting input time-series data provided for analysis and predictions. An example computer-implemented method includes receiving, by a processor, a time-series data input by a user. The computer-implemented method also includes computing, by the processor, a first plurality of predicted values based on the time-series data input by the user; computing, by the processor, a second plurality of predicted values by. The computer-implemented method also includes determining estimated time-series data based on the time-series data input by the user. The computer-implemented method also includes computing the second plurality of predicted values based on the estimated time-series data. The computer-implemented method also includes determining, by the processor, a defect in the time-series data input by the user based on a distribution of a plurality of differences between respective values from the first plurality of predicted values and the second plurality of predicted values.

17 Claims, 13 Drawing Sheets

(51) Int. Cl.
  *G06F 11/34* (2006.01)
  *G06F 11/30* (2006.01)
  *G06N 20/00* (2019.01)
  *G05B 23/02* (2006.01)

(52) U.S. Cl.
  CPC ...... *G06F 11/0742* (2013.01); *G06F 11/3024* (2013.01); *G06F 11/3452* (2013.01); *G06N 20/00* (2019.01)

(56) References Cited

U.S. PATENT DOCUMENTS

| | | |
|---|---|---|
| 2014/0018635 A1 | 1/2014 | Buchheim et al. |
| 2014/0180027 A1 | 6/2014 | Buller |
| 2014/0318883 A1 | 10/2014 | Noguchi |
| 2014/0336909 A1 | 11/2014 | Doit |
| 2016/0196175 A1 | 7/2016 | Kasahara |
| 2016/0334433 A1 | 11/2016 | Kazemi |
| 2017/0097860 A1 | 4/2017 | Pang |
| 2017/0126153 A1 | 5/2017 | Lepka |
| 2017/0363423 A1 | 12/2017 | Dormody |
| 2018/0164794 A1 | 6/2018 | Nikovski |
| 2018/0262384 A1 | 9/2018 | Menkhoff |
| 2018/0314573 A1 | 11/2018 | Chang |
| 2019/0066831 A1 | 2/2019 | Mairs |

OTHER PUBLICATIONS

List of IBM Patents or Patent Applications Treated as Related; Date Filed: Nov. 12, 2019, 2 pages.

INPUT DATA CORRECTION

DOMESTIC PRIORITY

This application is a continuation of U.S. Non-Provisional application Ser. No. 15/581,869, entitled "INPUT DATA CORRECTION", filed Apr. 28, 2017, which is incorporated herein by reference in its entirety.

BACKGROUND

The present invention generally relates to computer technology, and more specifically, to detecting error(s) in user-input data, such as in a time-series, and further to identifying a root-cause of the error(s), and in turn to correcting the user-input data.

Computer technology is used to analyze user-input time-series data, such as observations from a longitudinal study, human/machine health-related data, and so on. Typically, the user-input data is multidimensional, and further the analysis typically is used to generate data-driven insights and predictions powered by machine learning and other advanced mathematical models. Generating valid, accurate, and personalized insights and predictions is essential for providing value to users and establishing confidence in the analytical results.

SUMMARY

Embodiments of the present invention are directed to a computer-implemented method for correcting input time-series data. A non-limiting example of the computer-implemented method includes receiving, by a processor, a time-series data input by a user. The computer-implemented method also includes computing, by the processor, a predicted value based on the time-series data. The computer-implemented method also includes determining, by the processor, a defect in the time-series data input by the user based on a difference between the predicted value and a measured value.

The computer-implemented method further includes determining, by the processor, a cause of the defect in the time-series data automatically by using a machine learning algorithm. The computer-implemented method further includes displaying, by the processor, a prompt for the user, the prompt displaying the cause of the defect.

The computer-implemented method further includes computing, by the processor, an estimated time-series data for the user. The computer-implemented method further includes displaying, by the processor, a prompt for the user, the prompt displaying the cause of the defect and the estimated time-series data to be used instead of the time-series data input by the user. The computer-implemented method further includes, in response to the user selecting the estimated time-series data: computing, by the processor, a revised predicted value based on the estimated time-series data. The computer-implemented method may also include displaying, by the processor, the revised predicted value.

The computer-implemented method further includes determining that the cause of the defect is one from a group of causes including of the user under-reporting the time-series data, the user over-reporting the time-series data, and a sensor malfunction.

Embodiments of the present invention are directed to a system for correcting input time-series data. A non-limiting example of the system includes a memory; and a processor coupled with the memory. The processor receives a time-series data input by a user. The processor further computes a predicted value based on the time-series data. The processor further determines a defect in the time-series data input by the user based on a difference between the predicted value and a measured value.

In one or more examples, the processor further determines a cause of the defect in the time-series data automatically by using a machine learning algorithm. The processor further displays a prompt for the user, the prompt displaying the cause of the defect.

The processor further computes an estimated time-series data for the user. The processor further displays a prompt for the user, the prompt displaying the cause of the defect and the estimated time-series data to be used instead of the time-series data input by the user. The processor further, in response to the user selecting the estimated time-series data: compute a revised predicted value based on the estimated time-series data. The processor further displays the revised predicted value. The processor further determines that the cause of the defect is one from a group of causes including of the user under-reporting the time-series data, the user over-reporting the time-series data, and a sensor malfunction.

Embodiments of the invention are directed to a computer program product for correcting input time-series data, the computer program product comprising a computer readable storage medium having program instructions embodied therewith. The program instructions are executable by a processor to cause the processor to perform a method. A non-limiting example of the instructions cause the processing circuit to receive a time-series data input by a user. The instructions further cause the processing circuit to compute a first predicted value based on the time-series data input by the user. The instructions further cause the processing circuit to compute a second predicted value based on an estimated time-series data, the estimated time-series data computed based on the time-series data input by the user. The instructions further cause the processing circuit to determine a defect in the time-series data input by the user based on a difference between the first predicted value and the second predicted value.

In one or more examples, the program instructions further cause the processing circuit to display a prompt for the user, the prompt displaying the cause of the defect, and the estimated time-series data to be used instead of the time-series data input by the user. The program instructions are further executable to cause the processing circuit to determine that the cause of the defect is one from a group of causes including of the user under-reporting the time-series data, the user over-reporting the time-series data, and a sensor malfunction. In one or more examples, the estimated time-series data is computed using kalman filtering.

According to one or more embodiments of the present invention a computer-implemented method includes receiving, by a processor, a time-series data input by a user. The computer-implemented method also includes computing, by the processor, a first plurality of predicted values based on the time-series data input by the user; computing, by the processor, a second plurality of predicted values by. The computer-implemented method also includes determining estimated time-series data based on the time-series data input by the user. The computer-implemented method also includes computing the second plurality of predicted values based on the estimated time-series data. The computer-implemented method also includes determining, by the processor, a defect in the time-series data input by the user based on a distribution of a plurality of differences between respective values from the first plurality of predicted values and the second plurality of predicted values.

In one or more examples, the defect in the time-series is determined based on the distribution of the plurality of differences includes determining if the distribution is gaussian.

In one or more examples, the computer-implemented method further includes determining, by the processor, a cause of the defect in the time-series data automatically by using a machine learning algorithm based on the distribution of the plurality of differences. In one or more examples, the computer-implemented method further includes displaying, by the processor, a prompt for the user, the prompt displaying the cause of the defect and the estimated time-series data to be used instead of the time-series data input by the user. In one or more examples, the computer-implemented method further includes, in response to the user selecting the estimated time-series data: computing, by the processor, a revised predicted value based on the estimated time-series data. The computer-implemented method may also include displaying, by the processor, the revised predicted value.

According to one or more embodiments of the present invention, a system includes a memory; and a processor coupled with the memory, where the processor receives a time-series data input by a user. The processor further computes a first plurality of predicted values based on the time-series data input by the user; compute a second plurality of predicted values by: determining estimated time-series data based on the time-series data input by the user; and computing the second plurality of predicted values based on the estimated time-series data. The processor further determines a defect in the time-series data input by the user based on a distribution of a plurality of differences between respective values from the first plurality of predicted values and the second plurality of predicted values.

In one or more examples, the processor further determines a cause of the defect in the time-series data automatically by using a machine-learning algorithm based on the distribution of the plurality of differences. The processor further displays a prompt for the user, the prompt displaying the cause of the defect and the estimated time-series data to be used instead of the time-series data input by the user; and in response to the user selecting the estimated time-series data. The processor further computes a revised predicted value based on the estimated time-series data. The processor further displays the revised predicted value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
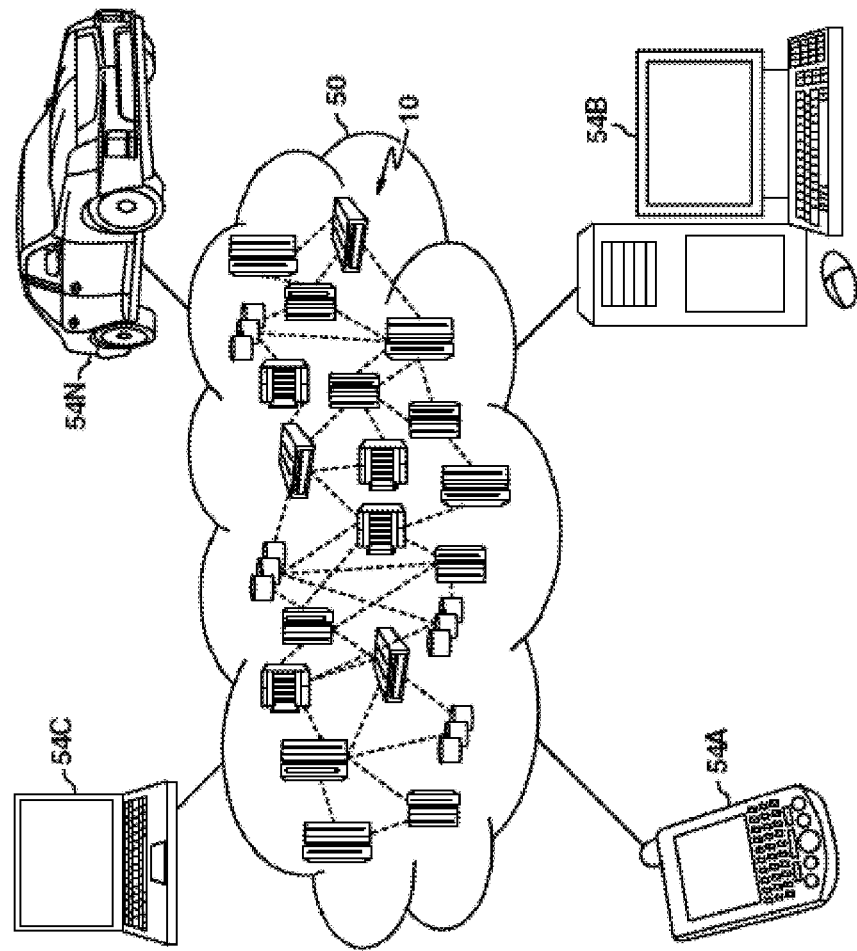
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Computer technology is used to analyze user-input time-series data. In order to achieve a high degree of accuracy despite inconsistencies in the data, the one or more embodiments of the present invention facilitate detecting defect(s) in input data that affects the analytics. Further, once the defect is detected the one or more embodiments of the present invention facilitate identifying a root-cause of the defect. Further yet, the one or more embodiments of the present invention facilitate taking remedial actions to correct the erroneous data. For example, a user is prompted to correct an erroneous data entry, or the data is automatically corrected through computational methods.

For example, the one or more embodiments of the present invention facilitate detecting, identifying, and correcting errors in user-input data regarding fitness tracking. It should be noted that the one or more embodiments of the present invention are applicable for detecting, identifying, and correcting errors in user-input data related to any other field, and that fitness tracking data is used as an example to describe the implementations and applications of one or more embodiments of the present invention.

For example, the use of computer applications and devices such as MYFITNESSPAL™, FITBIT™, and LOS-EIT!™ to track and manage fitness data is increasing. The data used by such computer program products is typically recorded on multiple dimensions of health and fitness such as daily steps, nutrition, sleep, and exercise. By tracking fitness and health data, users are empowered to analyze patterns in their data to discover both healthy and unhealthy behaviors and find where opportunities may exist for improvement.

Such computer program products, which may be collectively referred to as fitness apps in addition to providing users with simple descriptive statistics, facilitate generating data-driven insights and predictions powered by machine learning and other advanced mathematical models. The statistical rigor and significance of these insights is dependent on the models used and on the validity and reliability of the input data used by the models. Typically, the input data is entered by human users, or measured and calculated via consumer-grade devices such as activity trackers. However, inconsistencies and errors in the data lead the analytical methods to produce inaccurate predictions and insights.

For example, consider that a computer program product provides a prediction of weight-change over time using statistical methods using the input data from a user. However, such statistical methods are sensitive to missing or misreported data and may produce inaccurate predictions and insights due to such defects in the data. For example, a user that keeps a food diaries can fail to consistently report accurate daily food intake, either intentionally or accidentally, such as by omitting consumed food items. Furthermore, models used by the computer program product to calculate complex metrics such as energy expenditure by physical activity are trained on population-level data and can be highly inaccurate for certain subpopulations and individuals.

Accordingly, the one or more embodiments of the present invention addresses the above technical challenges by facilitating generating valid, accurate, and personalized insights and predictions, which are essential to providing value to users and establishing confidence in the analytical results. The one or more embodiments of the present invention, in order to achieve a high degree of accuracy despite inconsistencies in the data, detect the defects in the data that affect the analytics using differential calibration, and identify the root-cause of the defects. The one or more embodiments of the present invention further facilitate taking remedial actions to correct the erroneous data, for example, prompting a user to correct an erroneous data entry, or automatically correcting the data through computational methods.

In one or more examples, the data from the input data is corrected, prior to or during analyzing the data, by a cloud computing platform. In one or more examples, the analysis is performed by the same cloud computing platform, or a separate cloud computing platform from a separate cloud computing platform that corrects the input data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
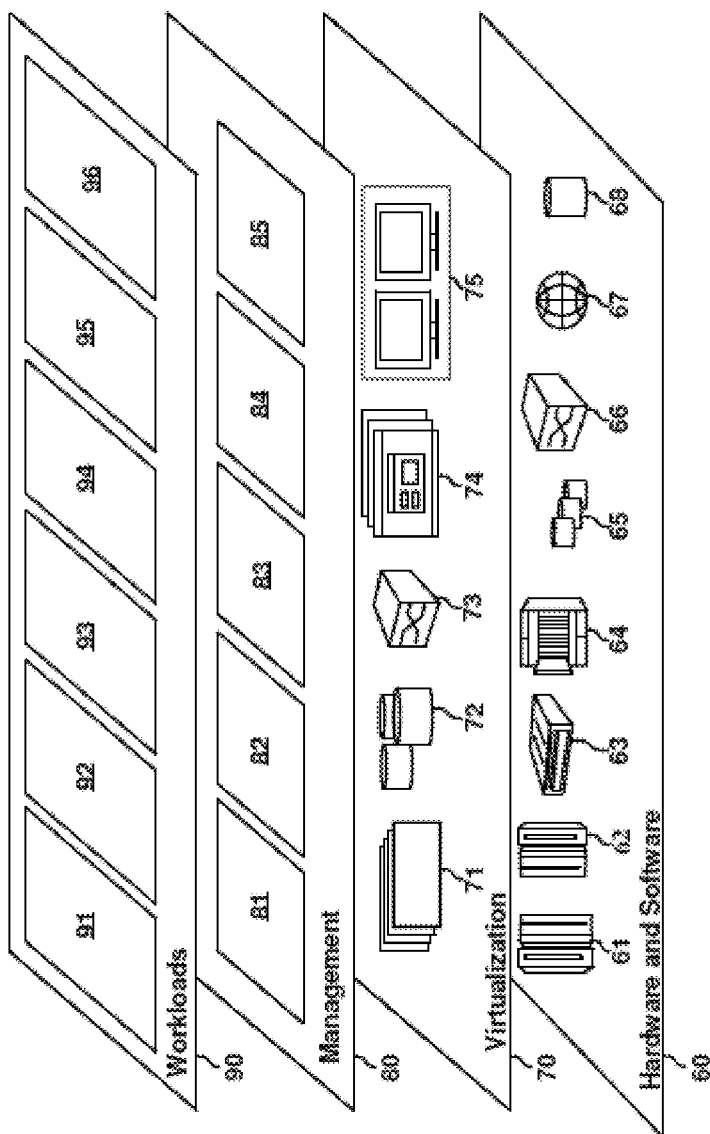
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and input data analysis 96.

Turning now to an overview of technologies that are more specifically relevant to aspects of the invention, typically linear quadratic estimation (LQE) algorithms, such as Kalman filtering and/or machine learning methods are used for calibrating measurements from input devices, optimizing objective functions, or predicting future events for chronically ill patients, collection and management of physiological data from devices for report generation, and intervention planning. The one or more embodiments of the present invention herein use LQE algorithms to address the technical problem of defects in the data received from consumer-grade health devices that then are used to generate predictions on fitness and wellness metrics for individual people. For example, the one or more embodiments of the present invention include methods, systems, computer program products, and other implementations for cleaning and processing data, generating predictions iteratively, and identifying the root-cause of data and prediction errors.

Additionally, the one or more embodiments of the present invention facilitate interaction(s) with a user to address the data defects. For example, in case of detected defects, a prompt is displayed to the user, where the user is prompted for input that facilitates the defect detection and data classification. Further, the one or more embodiments of the present invention facilitate adaptive data cleaning and pre-processing based on results from the analytics and user feedback.

For example, in case of the fitness tracking devices and computer program products, devices and products such as smartphone applications and wearable activity trackers record multiple dimensions of data (e.g. food intake, exercise, steps, heart rate, weight, etc.). The input data includes one or more time-series data, such as food intake over a period of one month, one year and so on; exercise over a period of three months; etc. The input data from these products are used to generate predictions and insights for the user, such as weight prediction. A defect in the input data can be introduced at any point in the process of generating the prediction/insight, for example during data collection, syncing databases, estimation algorithms, etc. For example, the defect may be introduced because of various root causes, such as a variation in device accuracy depending on use case, omission of input data because a user forgets or willfully omits data, under/overestimation by algorithm(s) used, such as to estimate caloric expenditure. As described herein, these defects in the input data make it difficult to generate accurate predictions based on the data. For example, predicting weight change over time is difficult if data on caloric intake and expenditure is inaccurate or incomplete.

Turning now to an overview of the aspects of the invention, one or more embodiments of the invention address the above-described shortcomings by detecting defects in the data, identifying root-cause(s) of the defects, ameliorating the data defects, and in turn, adjusting predictions to become more accurate.

The above-described aspects of the one or more embodiments of the present invention address the technical challenges by making the predictions to be adaptive. For example, one or more predictive models in fitness and wellness use static equations and are sensitive to noise and defects in the data. The one or more embodiments of the present invention use data-driven parameter learning that feeds into a dynamic system model to produce increasingly accurate predictions that adapt to changes in the data. Further, the one or more embodiments of the present invention facilitate identification of error root-cause to be adaptive. For example, traditional approaches attempt to calibrate and correct defects, and perform root-cause analysis using rule-based methods for identifying errors. The one or more embodiments of the present invention use classification algorithms to learn the distribution of defect root-causes from the real user input data. Further yet, the one or more embodiments of the present invention facilitate integration of user feedback. For example, results from the root-cause analysis can be surfaced to users to bring attention to the defects in the data entry. Additionally, the user can be prompted to enter verification of data validity. Such feedback from the users is ingested into the root-cause analysis for improving classification accuracy and improving data imputation.

Figure 3:
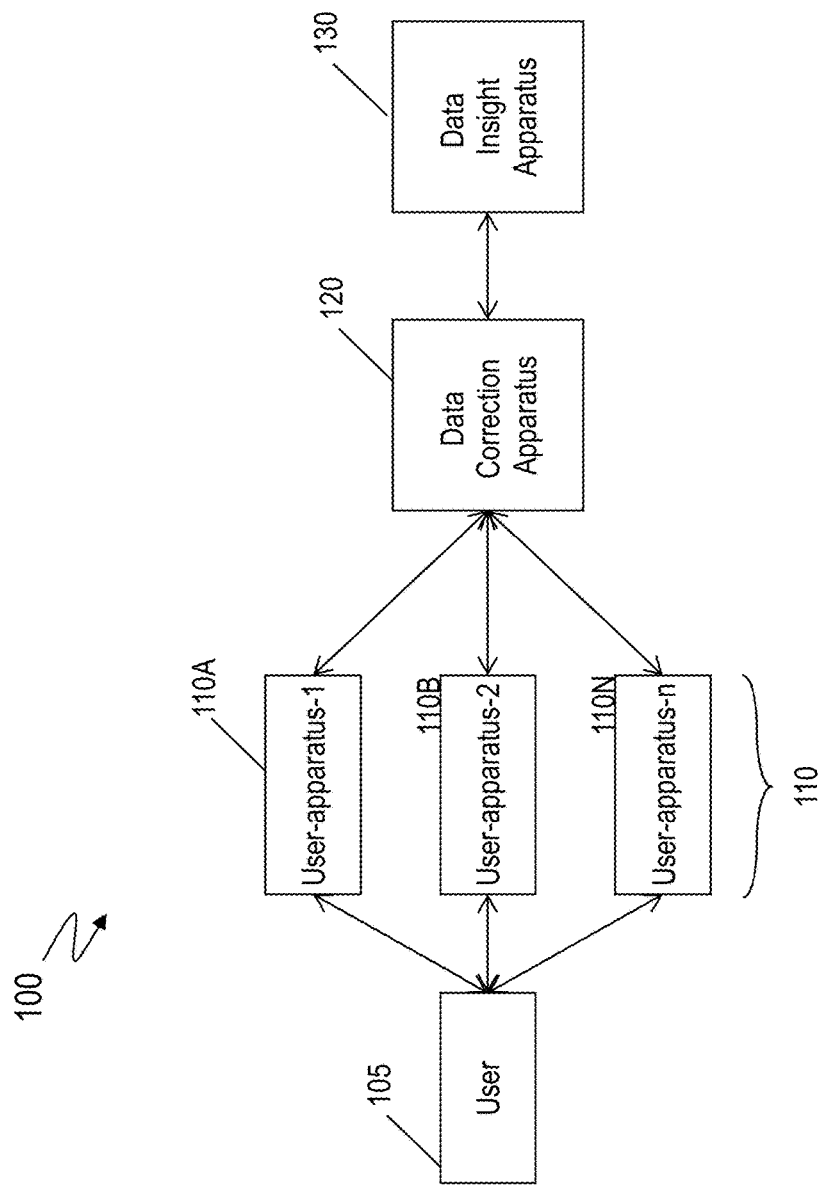
FIG. 3 depicts a data analysis system for correcting user input data, according to one or more embodiments of the present invention.

Turning now to a more detailed description of aspects of the present invention, FIG. 3 depicts a data analysis system 100 for correcting user input data, according to one or more embodiments of the present invention. In one or more examples, the data analysis system 100 analyzes fitness tracking data for a user 105. Alternatively, or in addition, the data analysis system 100 analyzes other type(s) of data for the user 105. In one or more examples, the data analysis system 100 is implemented using the cloud computing platform as described herein. For example, the data analysis system 100 includes one or more server computers that are remotely accessed over a communication network. Alternatively, or in addition, the data analysis system 100 is implemented as a local system.

In one or more examples, the data analysis system 100 includes one or more user-apparatus 110, such as user activity monitors, food intake monitors, phones, tablet computers, wearable devices, and other such type of apparatus that facilitate acquiring corresponding time-series of input data that is for analysis. The user-apparatus 110 may include a single user-apparatus-1 110A, such as a smartphone that the user 105 uses to manually enter input data for analysis. Alternatively, or in addition, the user-apparatus 110 includes multiple devices of different types. For example, the set of user-apparatus 110 includes a user-apparatus-1 110A, a user-apparatus-2 110B, and so on until a user-apparatus-N 110N. In one or more examples, the different user-apparatus track corresponding user-activity and/or food consumption using one or more sensors, such as a heart-rate monitor, a step-counter, a global position satellite sensor, a gyrometer, and the like.

In one or more examples, each of the user-apparatus 110 forwards the collected user-activity data for analysis. For example, the data is forwarded to predetermined destination, such as an internet protocol (IP) address, uniform resource locator (URL), or the like. In one or more examples, the data is additionally stored in a data repository (not shown) that is accessible by other components of the data analysis system 100. In one or more examples, the data repository is a database. Alternatively, or in addition, the data forwarded by the user-devices 110 is analyzed in real-time.

In one or more examples, the data analysis system 100 includes a data insight apparatus 130 that processes the data to generate a prediction and/or insight. For example, the data insight apparatus 130 predicts a weight-change for the user 105 in case the input data is user activity and/or food consumption time-series data.

The data analysis system 100 further includes a data correction apparatus 120 that automatically calibrates the user-input data, for example by detecting, identifying, and correcting defects (e.g. missing data, erroneous entries, etc.) in the input data. The data correction apparatus 120 processes the input data prior to the data insight apparatus 130 analyzes the input data. The data correction apparatus 120, by processing input data through both rule-based and machine learning approaches, facilitates the detection and correction of the missing, duplicate, and erroneous input data in an automated manner. For example, the data correction apparatus 120 uses dynamic system modeling and LQE algorithms such as Kalman Filtering to learn weights to facilitate the data insight apparatus 130 to iteratively produce increasingly accurate predictions that are subjected to noise, errors, and inaccuracies in the data.

Further, the data correction apparatus 120 uses classification algorithms to generate probability distributions over possible root-causes for the defects in the input data, and also discrepancies between predicted results and the actual results. The data correction apparatus 120 presents the updated predictions to the user 105. Additionally, the user 105 can be prompted to address possible data quality issues detected by the root-cause analysis, which can be used to retrain the root-cause classifiers.

Thus, the data correction apparatus 120 facilitates the data analysis system 100 to generate predictions and/or insights in a more adaptive manner despite defects in the input data. Further, the data correction apparatus 120 identifies the root-cause of the defective data in an adaptive manner, and integrates user feedback to correct the defective data, further improving accuracy of the predictions/insights.

It should be noted that although FIG. 3 depicts the data correction apparatus 120 and the insight apparatus 130 as separate boxes, in one or more examples, the data analysis system may implement the two apparatus on a single machine.

Figure 4:
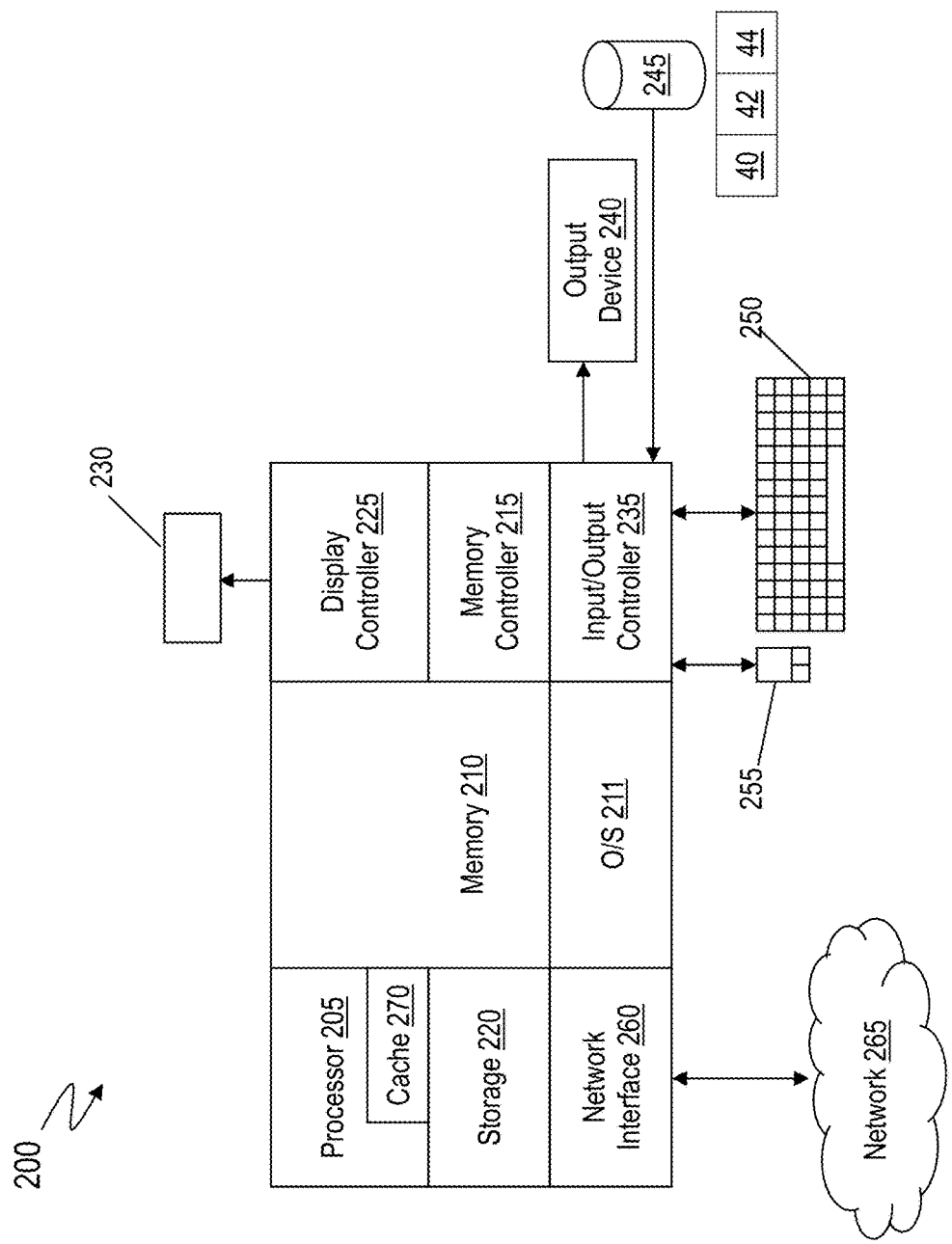
FIG. 4 depicts a communication apparatus according to one or more embodiments of the present invention.

FIG. 4 depicts a communication apparatus 200, according to one or more embodiments of the present invention. The communication apparatus may be a computer, such as a server, a laptop computer, a tablet computer, a phone, and the like. The communication apparatus 200 may be used as any one or more of the apparatus depicted in FIG. 3, such as the user-devices 110, the data correction apparatus 120, the data insight apparatus 130, or a combination thereof.

The communication apparatus 200 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the communication apparatus 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The communication apparatus 200 may further include a display controller 225 coupled to a user interface or display 230. In some embodiments, the display 230 may be an LCD screen. In other embodiments, the display 230 may include a plurality of LED status lights. In some embodiments, the communication apparatus 200 may further include a network interface 260 for coupling to a network 265. The network 265 may be an IP-based network for communication between the communication apparatus 200 and an external server, client and the like via a broadband connection. In an embodiment, the network 265 may be a satellite network. The network 265 transmits and receives data between the communication apparatus 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
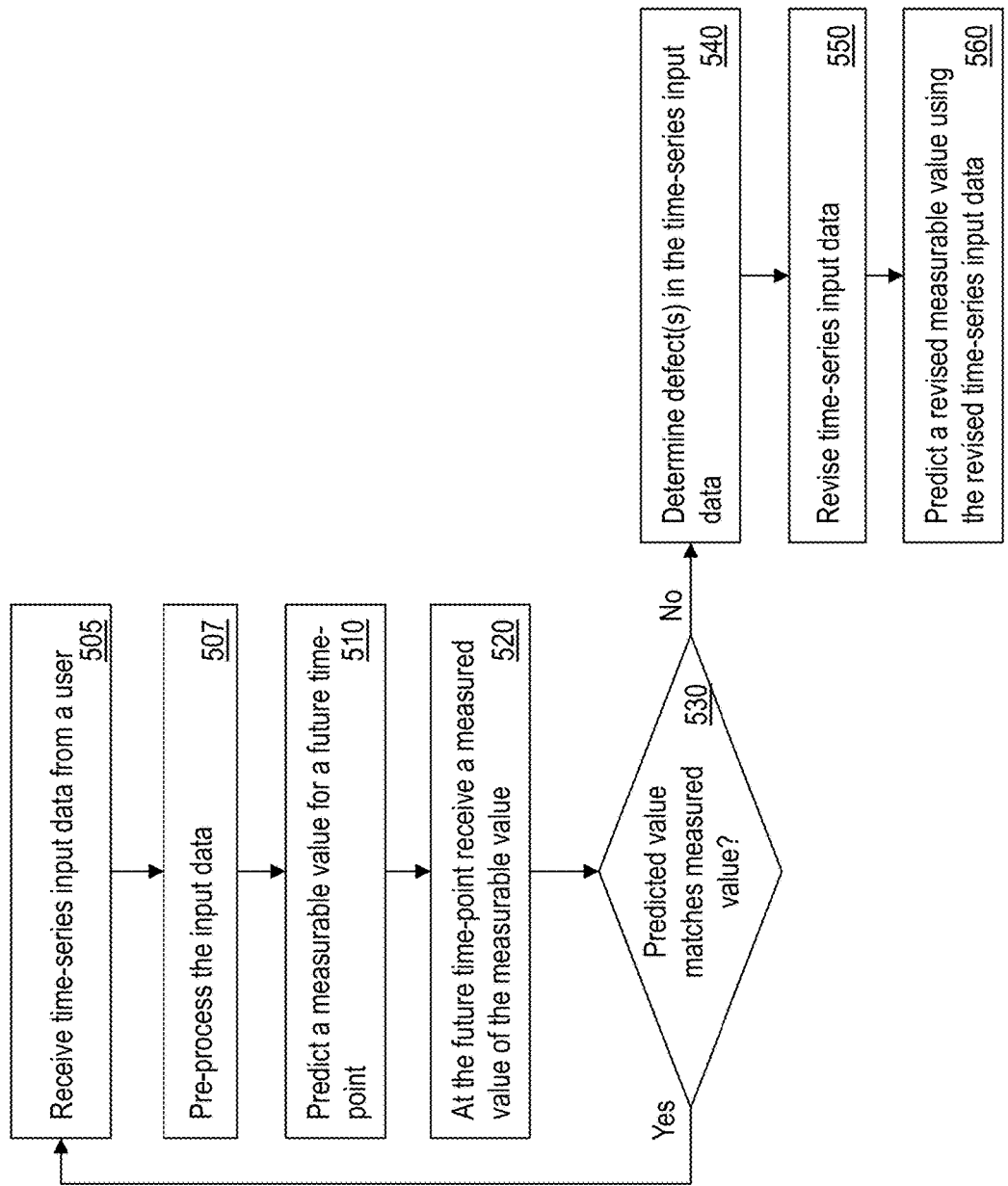
FIG. 5 illustrates a flowchart of an example method for correcting input data, according to one or more embodiments of the present invention.
Figure 6:
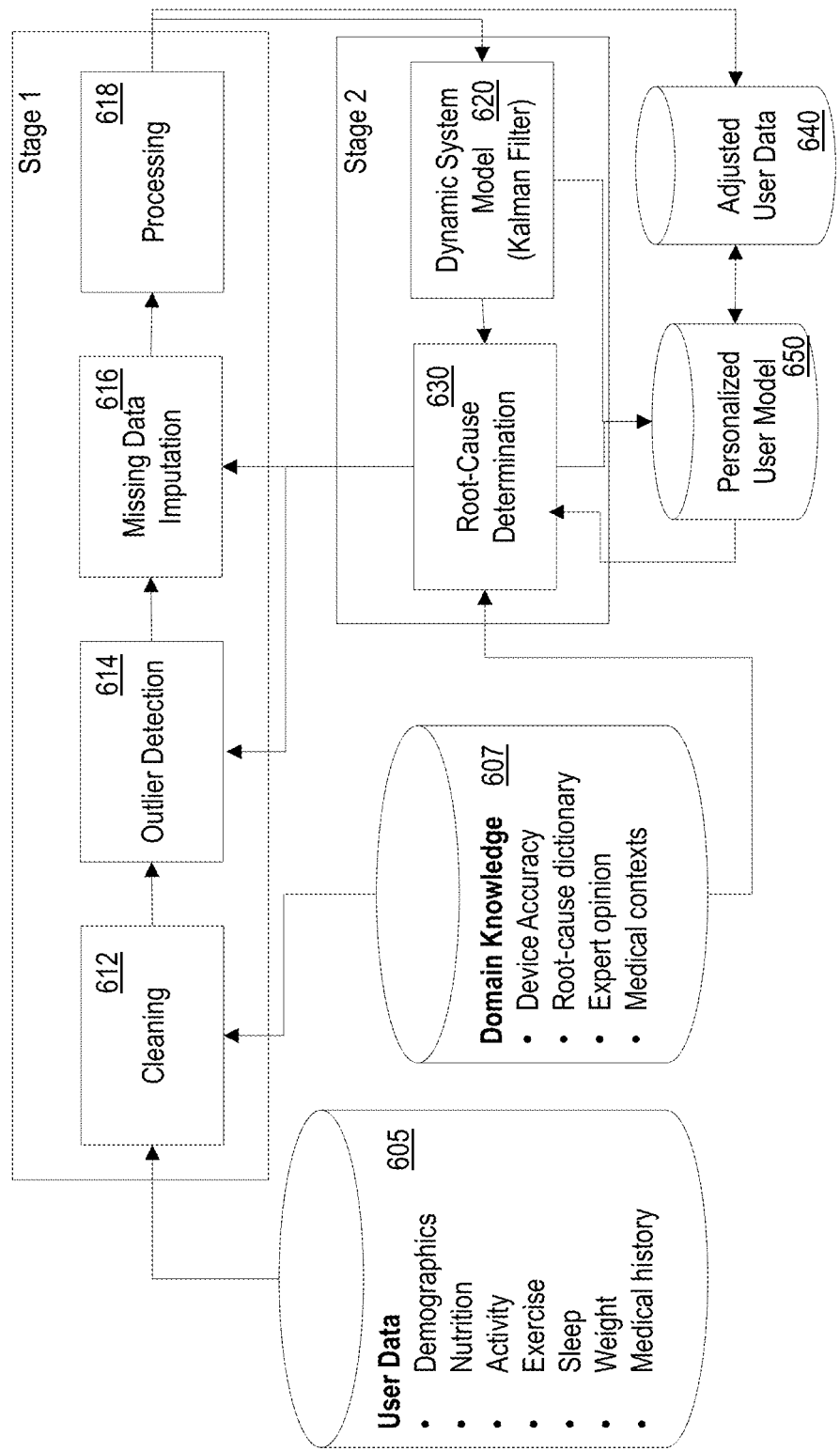
FIG. 6 illustrates a data-flow when implementing the method in an example scenario, such as the fitness tracking example scenario.

FIG. 5 illustrates a flowchart of an example method for correcting input data, according to one or more embodiments of the present invention. The one or more operations illustrated is implemented by one or more components of the data analysis system 100. FIG. 6 illustrates a data-flow when implementing the method in an example scenario, such as the fitness tracking example scenario.

The method includes receiving time-series input data from the user 105, as shown at 505. The time-series input data includes one or more data streams. The time-series input data includes data streams that the user enters manually. Alternatively, or in addition, the time-series input data includes data streams received automatically from one or more user-apparatus 110, such as wearable devices, smartphones, and the like. FIG. 6 illustrates examples of data-streams that may be input in the fitness tracking example scenario as user data 605. For example, the data-streams may include time-series input data for the user's demographics, nutrition, activity, exercise, sleep, weight, medical history, among others.

Referring back to FIG. 5, the data analysis system 100 pre-processes the input data, as shown at 507. For example, as shown in FIG. 6, the pre-processing includes domain knowledge 607 and machine learning methods to clean data 612, detect outliers 614, impute missing entries 616, and process the data 618 from each data source. Such pre-processing and processing of the input data may be referred to as a stage 1. In one or more examples, the pre-processing may be performed using domain knowledge 607 about the data-streams and/or the user-apparatus 110. For example, the domain knowledge 607 includes device accuracy, root-cause dictionary, expert opinion, medical contexts, and the like. In one or more examples, the cleaning data 612 includes deduplication, rule-based elimination of infeasible values, and the like. Further, the outlier detection includes identification of outliers for removal and/or normalization via statistical clustering, nearest neighbor, classification, and the like. Further, imputing missing entries 616 includes imputing missing data points in the input time-series data based on statistical learning methods such as, maximum likelihood estimation (MLE), splines, regression, auto-regressive moving average model with order n (timeframe), and the like. In addition, processing 618 of the input data includes aggregation to level-of-detail generating a prediction, feature extraction, and the like using the input data. Thus, the stage 1, or pre-processing includes adjusting the input time-series data or calibrating the data for using for generating predictions or insights by the data insight apparatus 130. In one or more examples, the adjusted time-series data is stored in a data repository of adjusted user-data 640.

Referring back to FIG. 5, the data analysis system 100 uses the input data to predict a measurable value for a future time-point, as shown at 510. For example, referring to FIG. 6, the data analysis system uses a dynamic system model 620 for combining the data streams from the input data to generate the prediction value, for example using algorithms like Kalman filtering, which iteratively learns coefficients and adjusts the prediction values in real-time to converge towards actual measured value. For example, in case of the fitness tracking example scenario, the processing 618 includes predicting a weight of the user 105 at a future time-point, and further adjusting the predicted values according to actual measured weight change measurements.

Referring back to FIG. 5, the actual measured values are received by the data analysis system 100 at the future time-point, as shown at 520. The data analysis system 100 compares the actual measured values, such as the weight, with the predicted value to check if the two match, as shown at 530. The predicted and measured values may be determined to match each other if the two values are within a predetermined threshold from each other. For example, the processed data from stage 1 is fed into a stage 2, where the dynamic system model 620 is used to predict a future value of a measureable value (for example, weight over time). In one or more examples, the parameters of the model 620 are estimated using a Kalman filter, and updates in real-time as more data is input by the user 105.

Referring back to FIG. 5, if the predicted and measured values match each other, the data analysis system 100 continues to operate as described. Alternatively, if the predicted and measured values do not match each other, the data analysis system 100 determines defect(s) in the time-series input data, as shown at 540. For example, referring to FIG. 6, the data correction apparatus 120 performs the correction using a root-cause determination 630. For example, classification algorithms are used to identify the root-cause of the defects in the data and discrepancies between predicted and actual weight change. In one or more examples, the input time-series data is corrected using the identified defects, as shown at 550. Further, the data analysis system 100 predicts a revised measurable value using the revised time-series input data, as shown at 560. Referring to FIG. 6, the root-cause determination 630 is performed using a personalized user model 650 that is unique to the user 105. In one or more examples, the personalized user model 650 identifies one or more defects associated with the data input from the user 105. For example, the personalized user model 650 identifies the user-apparatus 110 that the user 105 employs to measure one or more of the data inputs. Alternatively, or in addition, the personalized user model 650 identifies that the user 105 over/under reports one or more data inputs.

An example implementation of the dynamic system model 620 is now described in the context of the fitness tracking example scenario. The example implementation uses a Kalman filtering algorithm for an iterative estimation of weight to steer the prediction towards the actual measured results and to reduce prediction error. it should be noted that in other embodiments of the invention, the dynamic system model 620 uses other LQE algorithms and/or implemented in domains other than the fitness tracking.

Consider the example scenario where the data analysis system 100 receives as input time-series data for tracking fitness of the user 105, and predicts a change in weight for the user 105 using an energy balance (EB) equation. The EB equation describes a surplus or deficit of calories: EB=EI−EE, where EI=Energy Intake (food diary entries) and EE=Energy Expenditure (approximated by BMR, exercises, step counts). Here, body-mass ratio (BMR) is a function of height, weight, age, gender, and other such factors of the user 105. Based on the determined EB, the data analysis system 100 identifies that if EB>0, the user 105 experiences a weight gain, if EB<0, the user 105 experiences a weight loss, and in the case EB=0, the user 105 has a steady weight. Further, the data analysis system 100 uses domain knowledge 607 to determine that for the user 105 approximately 3500 calories is substantially equivalent to 1 lb of body mass, based on metabolism, genetics, body composition, diet, medical condition, and other such factors unique to the user 105. Thus, given the above model, and assuming accurate data input, the data analysis system 100 can predict weight-change over time given the daily energy balance.

Figure 7:
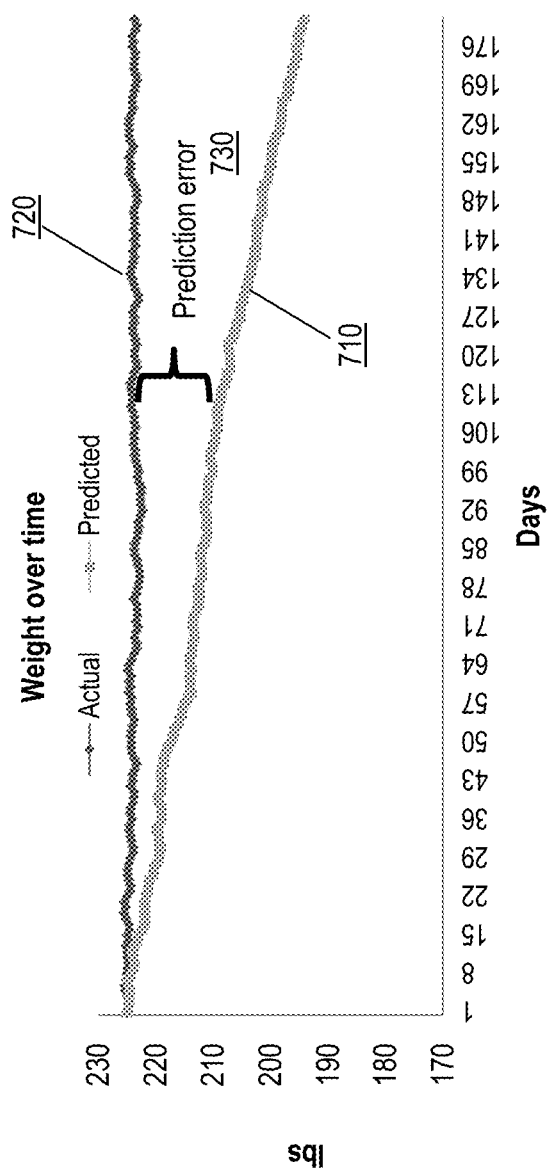
FIG. 7 depicts an example deviation between predicted and measured values.

However, such predictions are sensitive to accuracies/inaccuracies of the input data. For example, the user 105 can under/over report food consumption (EI), under/over report calories burned from exercise (EE). Alternatively, or in addition, wearable device measurements used by the user 105 as input can be inaccurate. For example, step counts reported are too high or low. Alternatively, or in addition, approximation equations can be wrong. For example, BMR is estimated to be too high, or can be affected by medical conditions. Alternatively, or in addition, calorie estimates from exercise can be wrong, resulting in defecting EE input. Thus, with such defective data being input to the data analysis system, the predicted weight values at future time-points do not match actual weight values measured when the future time-points occur. FIG. 7 depicts an example deviation between predicted and measured values. For example, the predicted weight values 710 do not match the measured weight values 720 as the days progress. Further, a prediction error 730, which is a difference between the predicted values 710 and measured values 720, keeps increasing in value over time. Thus, the data analysis system 100 is unable to generate accurate predictions because of the defects in the input data.

The data correction apparatus 120 facilitates the data analysis system 100 to address the above described technical challenge by identifying the defects in the input data, determining the root causes of the defects, and further facilitating correction of the input data. For example, continuing the above example scenario, the linear dynamical system model 620 using Kalman filtering can be mathematically expressed as in Table 1. The dynamical system model 620 includes the underlying/internal state variables (x) that are determined based on the time-series input variables (u), and noise corresponding to the fluctuations/variability in random state variables (q). For the weight tracking example, each time-point t, $x_{1,t}$ represents energy intake EI, $x_{2,t}$ represents energy expenditure EE, and $x_{3,t}$ represents the weight predicted. The EI, EE, are calculated using the input variables $u_{1,t}$ representing food consumed, $u_{2,t}$ representing user activity, and $u_{3,t}$ representing user exercise, for example. Correspondingly, $q_{1,t}$ represents noise in energy generated; $q_{2,t}$ represents noise in energy spent; and $q_{3,t}$ represents noise in weight.

TABLE 1

$$\underbrace{\begin{bmatrix} x_{1,t+1} \\ x_{2,t+1} \\ x_{3,t+1} \end{bmatrix}}_{x_{t+1}} = \underbrace{\begin{bmatrix} 1 & \alpha_1 & \alpha_2 \\ \beta_1 & 0 & \beta_2 \\ 1 & -1 & 1 \end{bmatrix}}_{\mathcal{A}} \underbrace{\begin{bmatrix} x_{1,t} \\ x_{2,t} \\ x_{3,t} \end{bmatrix}}_{x_t} + \underbrace{\begin{bmatrix} 1 & 0 & 0 \\ 0 & 1 & 1 \\ 0 & 0 & 0 \end{bmatrix}}_{\mathcal{B}} \underbrace{\begin{bmatrix} u_{1,t} \\ u_{2,t} \\ u_{3,t} \end{bmatrix}}_{u_t} + \underbrace{\begin{bmatrix} q_{1,t} \\ q_{2,t} \\ q_{3,t} \end{bmatrix}}_{q_t}$$

The dynamic system model 620 can be further expressed in matrix form as shown in Table 2.

TABLE 2

$\boxed{x_{t+1} = \mathcal{A} x_t + \mathcal{B} u_t + q_t}$, where $q_t \sim \mathcal{N}\{\overline{q}_t, \mathcal{Q}_t\}$
$x_0 \sim \mathcal{N}\{\overline{x}_0, \Sigma_0\}$, initial condition
$\mathcal{A}$ = Systems Matrix
$\mathcal{B}$ = Input Matrix
$\mathcal{Q}_t$ = Input noise Covariance
$\Sigma_0$ = Initial Covariance Further, the observed or measured values (y) are determined based on the based on the time-series input variables (u), and noise corresponding to the inaccuracies in measurements/recordings (r), and can be mathematically expressed as in Table 3, and in matrix form as depicted in Table 4.

TABLE 3

$$\underbrace{\begin{bmatrix} y_{1,t} \\ y_{2,t} \\ y_{3,t} \\ y_{4,t} \end{bmatrix}}_{y_t} = \underbrace{\begin{bmatrix} 0 & 0 & 1 \\ 0 & 0 & 0 \\ 0 & 0 & 0 \\ 0 & 0 & 0 \end{bmatrix}}_{\mathcal{C}} \underbrace{\begin{bmatrix} x_{1,t} \\ x_{2,t} \\ x_{3,t} \end{bmatrix}}_{x_t} + \underbrace{\begin{bmatrix} 0 & 0 & 0 \\ 1 & 0 & 0 \\ 0 & 1 & 0 \\ 0 & 0 & 1 \end{bmatrix}}_{\mathcal{D}} \underbrace{\begin{bmatrix} u_{1,t} \\ u_{2,t} \\ u_{3,t} \end{bmatrix}}_{u_t} + \underbrace{\begin{bmatrix} r_{1,t} \\ r_{2,t} \\ r_{3,t} \end{bmatrix}}_{r_t}$$

TABLE 4

$\boxed{y_t = \mathcal{C} x_t + \mathcal{D} u_t + r_t}$, where $r_t \sim \mathcal{N}\{\overline{r}_t, \mathcal{R}_t\}$
$\mathcal{C}$ = Observations/Output Matrix
$\mathcal{D}$ = Feed-forward Matrix
$\mathcal{R}_t$ = Measurement noise Covariance In one or more examples, the data analysis system 100 learns the model matrices A, B, C, D and the noise covariance matrices Q, R, and $\Sigma_0$ using data-driven approach, for example, minimizing least-square errors. Further, the data analysis system 100 uses machine learning algorithms, such as Kalman filter, to estimate the state variables (x) and predict the output for future time-points of the dynamical model system 620.

Figure 8:
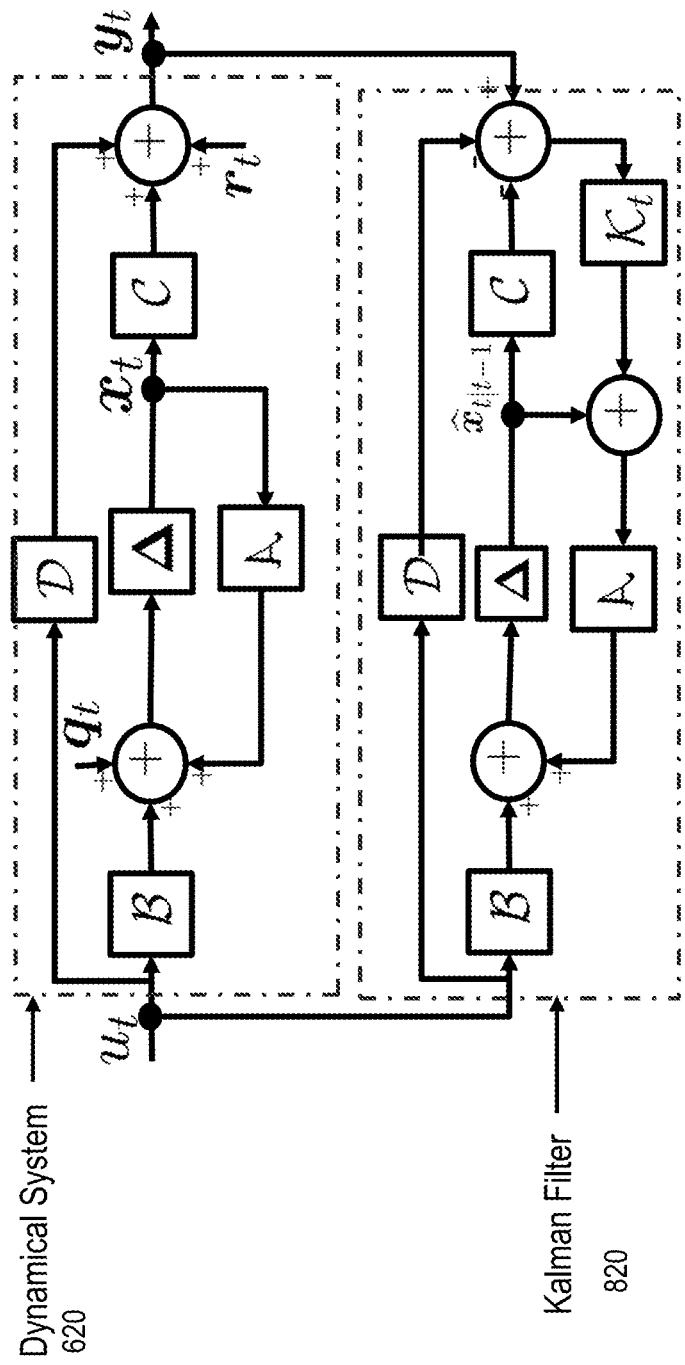
FIG. 8 illustrates predicting values at future time-points using a dynamic system model, according to one or more embodiments of the present invention.

FIG. 8 illustrates predicting values at future time-points using the dynamic system model 620, according to one or more embodiments of the present invention. The dynamic system model 620 and a Kalman filter algorithm module 810 receive the input data (u). In one or more examples, the Kalman filter algorithm module 810 is an implementation by the data correction apparatus 120. Alternatively, or in addition, the Kalman filter algorithm module 810 is an electronic circuit, or other such component of the data correction apparatus 120. In one or more examples, the input data is the adjusted data obtained after pre-processing the data from the user 105. The output (y) from the dynamic system model 620 are input to the Kalman filter module 810. The Kalman filter module 810 determines an estimate of the state variables (x), and further determines an error between the predicted state variables and the actual/measured values (y). Further, the Kalman filter module 810 further predicts the state variables for a future time point t+1 as shown in Table 5.

TABLE 5

$$\hat{x}_{t|t} = \hat{x}_{t|t-1} + \mathcal{K}_t \left( y_t - \underbrace{(\mathcal{C}\hat{x}_{t|t-1} + \mathcal{D}u_t)}_{\hat{y}_t} \right), \text{ where}$$

$$\hat{x}_{t+1|t} = \mathcal{A}\hat{x}_{t|t} + \mathcal{B}u_t$$

$\hat{x}_{t|t}$ = Estimate of $x_t$ at time t.
$\hat{x}_{t+1|t}$ = Prediction of $x_{t+1}$ at time t.
$\mathcal{K}_t$ = Kalman Gain.

In the fitness tracking example, the output prediction values for the weight from the dynamic system model 620 and the Kalman filter module 810 are computed as $\epsilon_t = y_t - \hat{y}_t \sim \mathcal{N}(\mu_t, \Sigma_t)$, where $\mu_t$ is prediction error based on q and r, and $\Sigma_t$ is prediction error covariance. For example, the data correction apparatus 120 compares the theoretical and real time empirical values of $\mu_t$ and $\Sigma_t$. If distribution of the errors do not match, then the covariance matrix is used to check which of the observation variables (y) deviates from the predicted values (x).

For example, if the food intake input $u_1$ values predicted by the Kalman filter module 810 differ from the user input values $y_2$ of the food intake, the data correction apparatus 120 determines root-causes for the difference. In one or more examples, the data correction apparatus 120 provides confidence scores for one or more root-causes that lead to the deviation. The user 105 selects the root-cause from the list.

Figure 9:
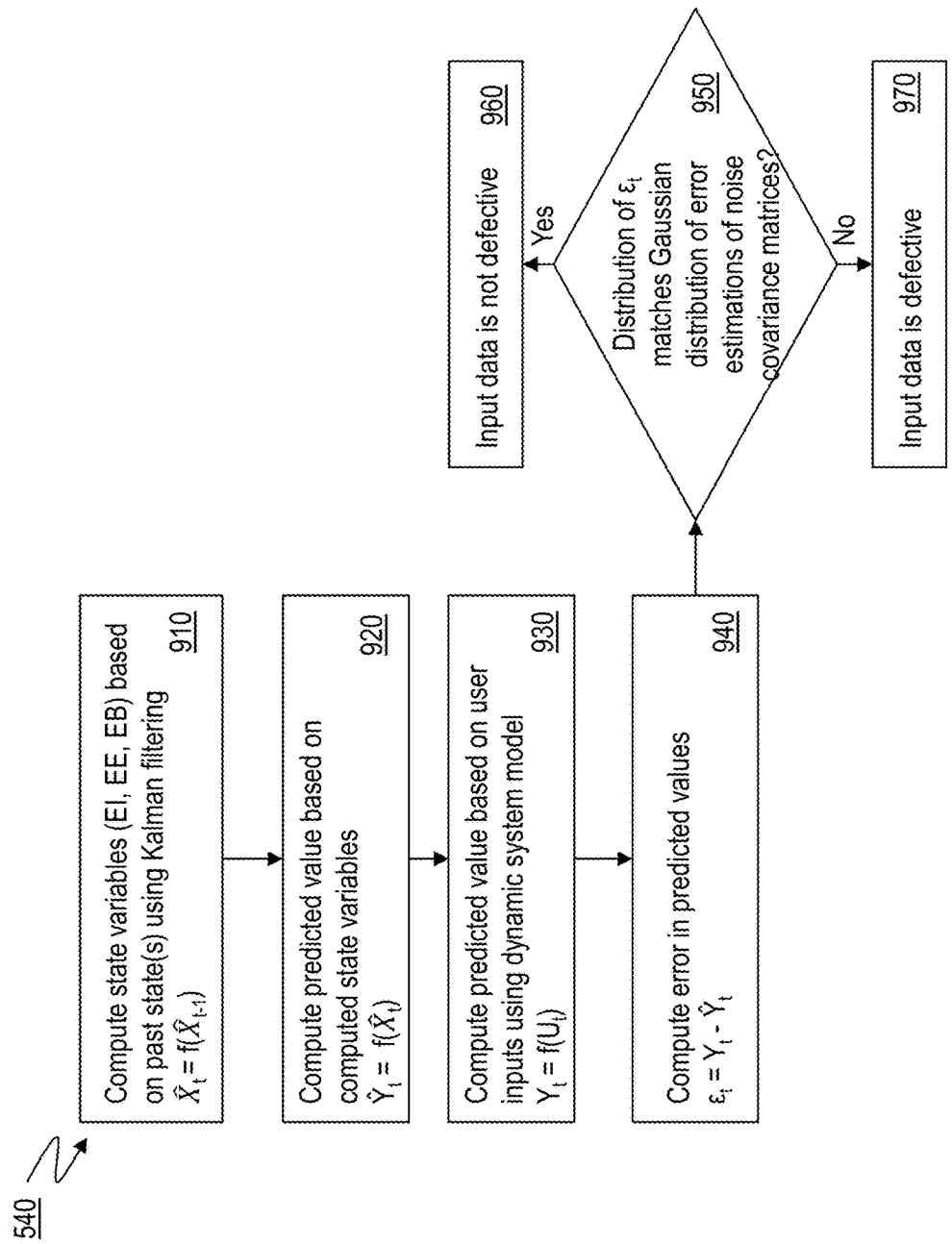
FIG. 9 illustrates a flowchart of an example method for determining if the input data contains defects, according to one or more embodiments of the present invention.

FIG. 9 illustrates a flowchart of an example method for determining if the input data contains defects, according to one or more embodiments of the present invention. In one or more examples, the operations of this method are implemented as part of block 540 of FIG. 5. The data correction apparatus 120 implements the method. The data correction apparatus 120 computes the state variables, such as the energy intake, energy expensed based on the past state of the dynamic state model 620 using the Kalman filter module 810, as shown at 910. For example, as described herein, the Kalman filter module 810 computes $\hat{X}_t$ based on $\hat{X}_{t-1}$. The data correction apparatus 120 further computes a predicted value, for example weight, based on the computed state variables from the Kalman filter module 810, as shown at 920. For example, the data correction apparatus 120 computes $\hat{Y}_t$ based on $\hat{X}_t$. In addition, the data insight apparatus 130 computes a predicted value (second predicted value) based on user input data using dynamic system model 620, as shown at 930. For example, the data insight apparatus 130 computes $Y_t$ based on the input variables $U_t$.

Further, the data correction apparatus 120 compares and computes a difference (or an error) between the two separate prediction values, a first computed based on past state of the state variables from the Kalman filter module 810, and a second computed based on user input data, as shown at 940. For example, the data correction apparatus 120 computes $\epsilon_t = Y_t - \hat{Y}_t$.

The data correction apparatus 120 checks if a distribution of $\epsilon_t$ matches Gaussian distribution of error estimations of noise covariance matrices Q and R, as shown at 950. The Q and R noise covariance matrices represent the inaccuracies in the state variable calculations and input data recording respectively. In one or more examples, the distribution match is determined by comparing statistical parameters of the vectors, such as mean, covariance, or the like. If the distributions of $\epsilon_t$ and Q, R matrices match, the data correction apparatus 120 deems that the input data from the user 105 is not defective, as shown at 960. If the distributions do not match, the data correction apparatus 120 deems that the input data from the user 105 is defective, as shown at 970.

Figure 10:
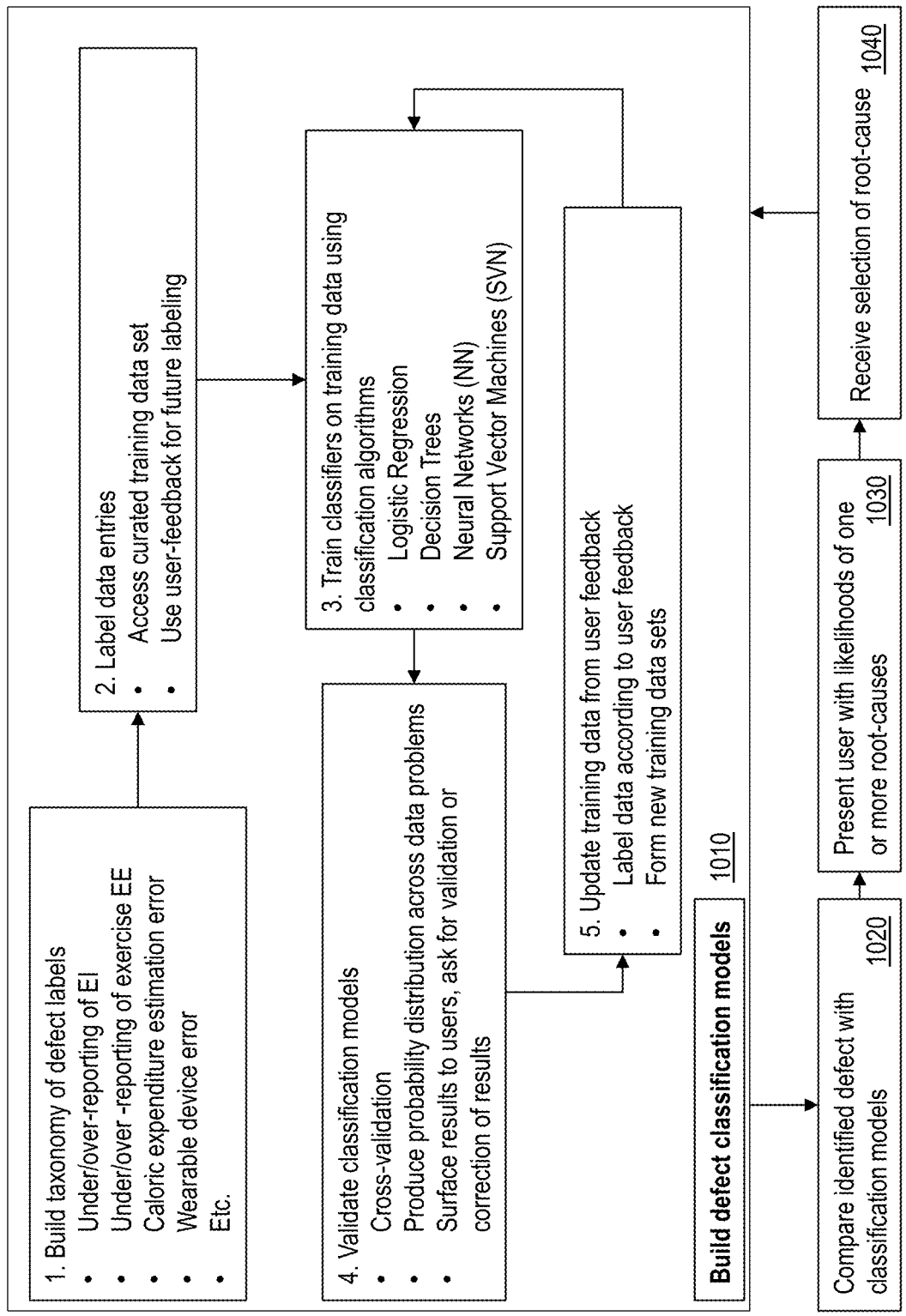
FIG. 10 illustrates a flowchart of an example method for detecting a root-cause of a defect identified in the input data, according to one or more embodiments of the present invention.

FIG. 10 illustrates a flowchart of an example method for detecting a root-cause of the defect identified in the input data, according to one or more embodiments of the present invention. The data correction apparatus 120 compares the identified defect in the input data with root-cause classification models, as shown in 1020. In one or more examples, the comparison is performed using artificial neural networks, or other machine learning techniques. In one or more examples, the data correction apparatus 120 builds the root-cause classification models, as shown at 1010. In one or more examples, the root-cause classification models are built prior to the first use of the data analysis system 100, and further the data correction apparatus 120 maintains and continuously updates the models.

For example, building the models includes building taxonomy of defect labels, as shown at 1010-1. The labels may be specific to the input data being tracked. For example, in the fitness tracking example, the labels include under/over-reporting of food EI, under/over-reporting of exercise EE, caloric expenditure estimation error, wearable device error, and so on. In one or more examples, curated training data set with such labels assigned to samples are created, as shown at 1010-2. In one or more examples, any feedback received from the user 105 during the use of the data analysis system 100 is stored in the training data set. For example, if the user 105 identifies that a specific entry is an overreporting of EE, that entry and the corresponding label is included in the training data set.

Further, the method includes training one or more classifiers using the curated training data using classification algorithms such as logistic regression, decision trees, neural networks, Support Vector Machines (SVN), and the like, as shown at 1010-3. The classification models are validated, as shown at 1010-4. In one or more examples, the validation is performed using cross-validation of one or more classifiers, or by producing probability distribution across data problems. In one or more examples, the validation is performed by displaying results to the user 105, and receiving validation or correction of results from the user 105, via the user-interface.

The method further includes updating the training data using the user feedback, as shown at 1010-5. For example, the updating includes updating a label data in the training dataset according to user feedback. In one or more examples, a separate training set is formed using the user feedback. The classifiers are further trained using the user feedback.

Referring back to FIG. 10, the method of determining the root-cause further includes presenting the user 105 with likelihoods of one or more root-causes that are identified, as shown at 1030.

Figure 11:
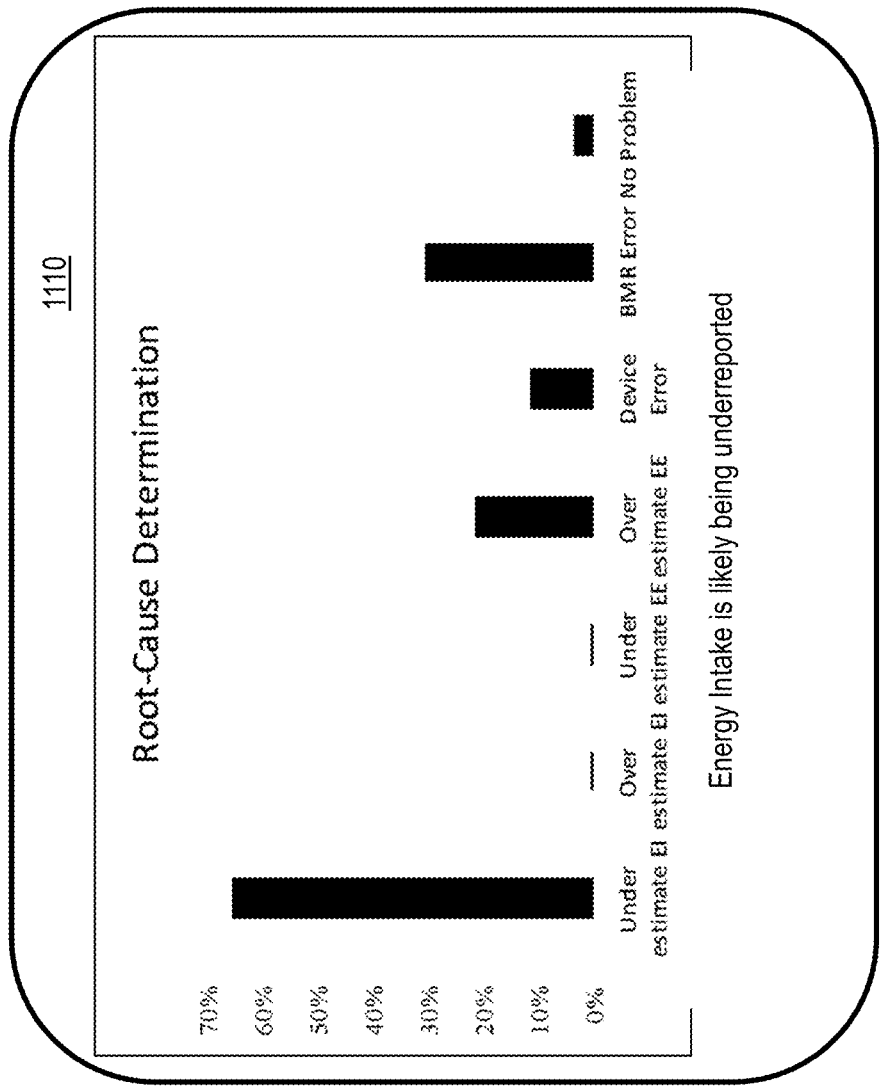
FIG. 11 depicts an example user-interface generated by the data correction apparatus according to one or more embodiments of the present invention.

FIG. 11 depicts an example user-interface generated by the data correction apparatus 120 according to one or more embodiments of the present invention. For example, the data correction apparatus 120 displays a user-interface screen 1110 that includes the likelihoods of one or more root-causes that are identified. In one or more examples, the likelihoods of the one or more labels (or root-causes) in the training data set are displayed. In one or more examples, the likelihoods are depicted in the form of a graph. It should be noted that in other examples, the likelihoods may be presented to the user 105 in different forms than shown here, such as pie-chart, text, and the like. Further, the label with the highest likelihood is selected as the root-cause, as depicted in FIG. 11.

In one or more examples, the user 105 can select one of the root-causes from the user-interface 1110, irrespective of the likelihoods determined by the data correction apparatus 120, as shown at 1040. For example, the data correction apparatus 120 may determine that the data is being under-reported based on the calculated likelihoods, although actually the device being used by the user 105 may be experiencing some malfunction. Accordingly, the user 105 may select the device error root-cause, overriding the determination by the data correction apparatus 120. The selected label is then updated in the training data set.

Figure 12:
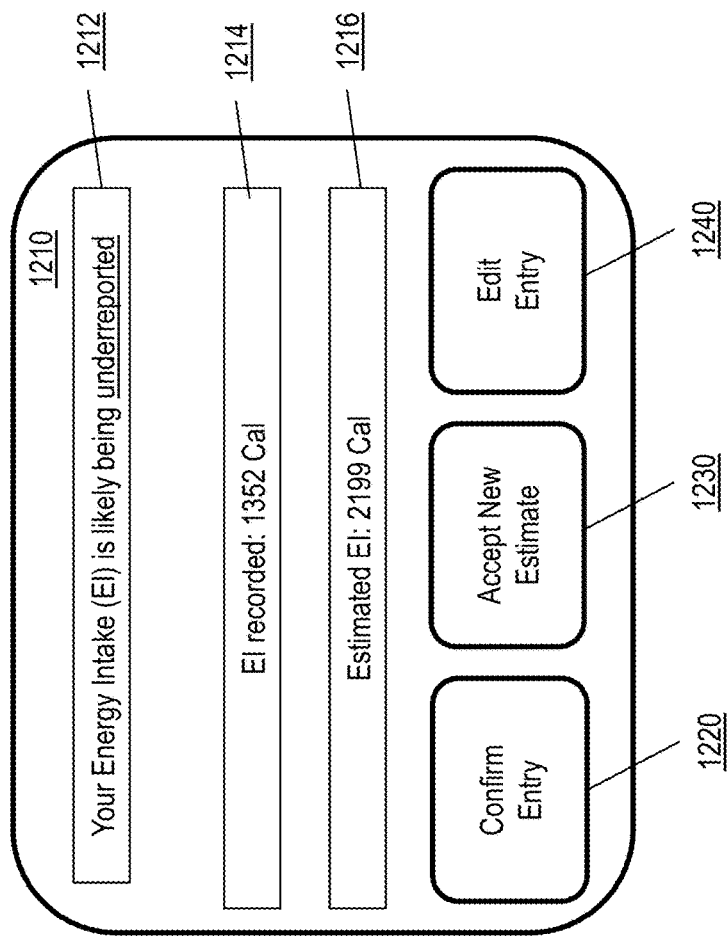
FIG. 12 depicts example user-interface generated by the data correction apparatus according to one or more embodiments of the present invention.

Further, referring back to FIG. 5, after determining the defective data and the corresponding root-cause, the user 105 is presented the defective time-series input data for revision. FIG. 12 depicts example user-interface generated by the data correction apparatus 120 according to one or more embodiments of the present invention. For example, the data correction apparatus displays the user-interface screen 1210 that indicates the recorded data 1214 that is determined to be defective, the root-cause of the defect 1212, and an estimated data entry 1216 to replace the defective data. The estimate is computed by the Kalman filter module 810. The data correction apparatus further includes one or more user-interactive elements to facilitate the user 105 to provide feedback/revisions. For example, the data correction apparatus 120 includes on the user-interface 1210 a user-interactive element 1220 that facilitates the user 105 to confirm the recorded data 1214 as accurate. Alternatively, or in addition, the user-interface 1210 includes a user-interactive element 1230 that facilitates the user 105 to replace/revise the recorded input data 1214 with the estimated value 1216. In one or more examples, the user interface 1210 includes a user-interactive element 1240 that facilitates the user 105 to edit the recorded input value 1214 manually, for example to new value that is different than the estimated value 1216. The user-interface 1210 thus facilitates the user 105 to revise the input time-series data. It should be noted that the user-interface 1210 depicted is one example, and that in other examples the data correction apparatus 120 generates different user-interface screens that include additional, fewer, and/or different user-interface elements than those displayed in FIG. 12.

Figure 13:
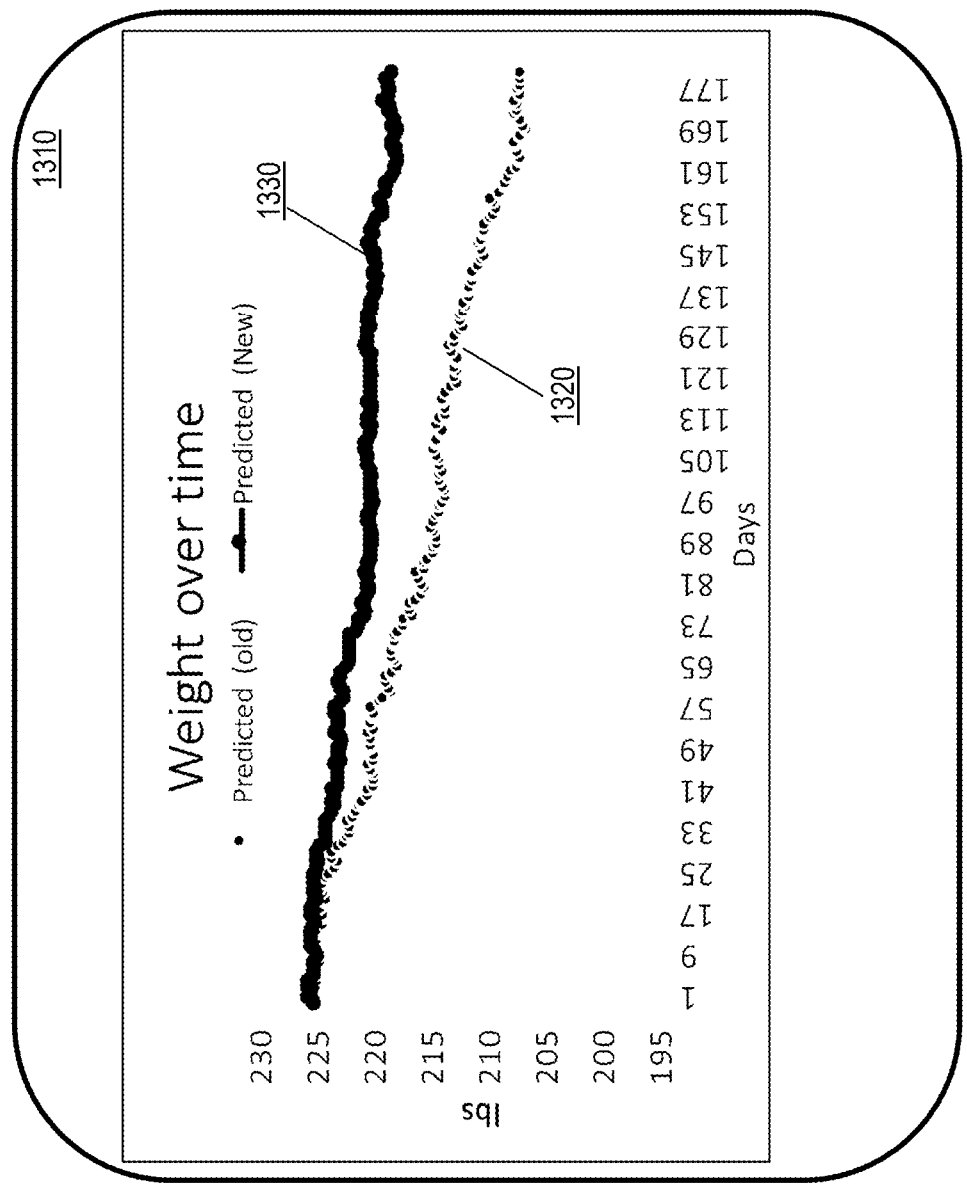
FIG. 13 depicts an example user-interface according to one or more embodiments of the present invention.

Referring back to FIG. 5, the data analysis system 100 uses the revised input data to generate a new prediction, as shown in 560. In one or more examples, the new prediction is presented to the user 105. FIG. 13 depicts an example user-interface 1310 according to one or more embodiments of the present invention. For example, the user-interface 1310 presents the old prediction values 1320 based on the defective input data, as well as the new prediction values 1330 based on the revised, corrected input data. In one or more examples, such a visual depiction of the two predictions facilitates the user 105 to revisit the corrections s/he may have done earlier.

Thus, the technical solutions described herein facilitate a system to clean and analyze data, and further generate predictions and insights based on the data. In one or more examples, the cleaning stage facilitates removing detectable erroneous data, removing/fixing outliers, and imputing missing data in the input data. Further, the system facilitates performing data transformations used for generating future prediction using machine learning methods. In one or more examples, cleaning the data includes rule-based criteria established from domain knowledge, published literature, and expert opinion. Alternatively, or in addition, outlier detection and remediation is performed via statistical clustering, nearest neighbor or classification algorithms. Alternatively, or in addition, imputation of missing data is performed via statistical learning methods such maximum likelihood estimation, splines, regression, and Auto-Regressive Moving Average models. Further yet, in one or more examples, the processing algorithm aggregates the data to a sufficient level-of-detail required in future steps and extracts features from the input data that are curated by domain knowledge including expert opinion and published literature.

Further, the system employs and implements a dynamic system model to predict future value(s) of one of the data types of interest to the end-user, for example using machine learning techniques. For example, the input data is applied to a predictive model that is represented as a dynamical system of equations.

Further yet, the system includes a module or subsection that utilizes LQE algorithms such as Kalman filter to improve the prediction ability of the aforementioned model and further to estimate model parameters. For example, the parameters of the predictive model are calibrated via the Kalman filter approach.

Further yet, the system includes a root-cause analysis module/subsection that uses machine learning classification algorithms (kNN, clustering, neural networks, etc.) to determine which errors exist in the input data and predictions and to classify the likelihood of these errors. In one or more examples, the data and features generated by the predictive model, the parameters of the prediction model generated using the Kalman filtering, and domain knowledge and expert opinion are used to train a machine learning classification model to identify the likelihood of data and prediction errors. In one or more examples, the contents of the results of the root-cause analysis include an updated prediction, and the root-cause error classifications, and prompts asking the user to confirm or edit the suspected data errors.

In one or more examples, the data used as input data is received from consumer devices such as activity trackers, smart watches, or smart scales, and entered manually by an end-user via a smartphone, web-based application, and the like. For example, in one or more examples, displaying of results can occur through prompts in a smartphone or web-based application and prompts the user to confirm or edit the erroneous/defective input data. In one or more examples, the user input is stored, used to label the user data, and fed back to the classification algorithm to improve classification accuracy.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
receiving, by a processor, an input time-series data;
computing, by the processor, state variables based on past states in the input time-series data;
computing, by the processor, a first set of predicted values based on the state variables;
computing, by the processor, a second set of predicted values based on a dynamic system model;

determining, by the processor, a distribution of differences between the first set of predicted values and the second set of predicted values;

in response to the distribution of differences not matching a predetermined distribution, notifying, by the processor, that the input time-series data is defective; and in response to the input time-series data being defective, determining, by the processor, a root cause of a defect in the input time-series data using machine learning.

2. The computer-implemented method of claim 1, wherein the predetermined distribution is a Gaussian distribution of inaccuracies in the state variable computations.

3. The computer-implemented method of claim 1, wherein the distribution match is determined by comparing statistical parameters of the distribution of differences and the predetermined distribution, wherein the statistical parameters comprise at least one of a mean and a covariance.

4. The computer-implemented method of claim 1, further comprising:

displaying, by the processor, a prompt for a user, the prompt displaying the input time-series data and an estimated time-series data to be used instead of the input time-series data; and receiving, by the processor, a selection of time-series data to be used.

5. The computer-implemented method of claim 4, further comprising, in response to the selection of the estimated time-series data:

computing, by the processor, a revised predicted value based on the estimated time-series data; and displaying, by the processor, the revised predicted value.

6. The computer-implemented method of claim 1, further comprising determining that the cause of the defect in the input time-series data is one from a group of causes comprising under-reporting of the time-series data, over-reporting of the time-series data, and a malfunction of a sensor that provides the time-series data.

7. A system comprising:

a memory; and a processor coupled with the memory, the processor configured to perform a method comprising:

receiving an input time-series data;

computing state variables based on past states in the input time-series data;

computing a first set of predicted values based on the state variables;

computing a second set of predicted values based on a dynamic system model;

determining a distribution of differences between the first set of predicted values and the second set of predicted values;

in response to the distribution of differences not matching a predetermined distribution, notifying that the input time-series data is defective; and in response to the input time-series data being defective, determining, by the processor, a root cause of a defect in the input time-series data using machine learning.

8. The system of claim 7, wherein the predetermined distribution is a Gaussian distribution of inaccuracies in the state variable computations.

9. The system of claim 7, wherein the distribution match is determined by comparing statistical parameters of the distribution of differences and the predetermined distribution, wherein the statistical parameters comprise at least one of a mean and a covariance.

10. The system of claim 7, wherein the method further comprises:

displaying, by the processor, a prompt for a user, the prompt displaying the input time-series data and an estimated time-series data to be used instead of the input time-series data; and receiving, by the processor, a selection of time-series data to be used.

11. The system of claim 10, wherein the method further comprises, in response to the selection of the estimated time-series data:

computing, by the processor, a revised predicted value based on the estimated time-series data; and displaying, by the processor, the revised predicted value.

12. The system of claim 7, further comprising determining that the cause of the defect in the input time-series data is one from a group of causes comprising under-reporting of the time-series data, over-reporting of the time-series data, and a malfunction of a sensor that provides the time-series data.

13. A computer program product comprising a memory storage device having computer executable instructions stored therein, which when executed by a processing unit causes the processing unit to perform a method comprising:

receiving an input time-series data;

computing state variables based on past states in the input time-series data;

computing a first set of predicted values based on the state variables;

computing a second set of predicted values based on a dynamic computer program product model;

determining a distribution of differences between the first set of predicted values and the second set of predicted values;

in response to the distribution of differences not matching a predetermined distribution, notifying that the input time-series data is defective; and in response to the input time-series data being defective, determining, by the processor, a root cause of a defect in the input time-series data using machine learning.

14. The computer program product of claim 13, wherein the predetermined distribution is a Gaussian distribution of inaccuracies in the state variable computations.

15. The computer program product of claim 13, wherein the distribution match is determined by comparing statistical parameters of the distribution of differences and the predetermined distribution, wherein the statistical parameters comprise at least one of a mean and a covariance.

16. The computer program product of claim 13, wherein the method further comprises:

displaying, by the processor, a prompt for a user, the prompt displaying the input time-series data and an estimated time-series data to be used instead of the input time-series data; and receiving, by the processor, a selection of time-series data to be used.

17. The computer program product of claim 16, wherein the method further comprises, in response to the selection of the estimated time-series data:

computing a revised predicted value based on the estimated time-series data; and displaying the revised predicted value.

* * * * *